Jan. 23, 1973 G. KRAUSE 3,712,988

ANALOG DELAY CIRCUIT USING STORAGE DIODES

Original Filed Sept. 18, 1968

Inventor:
Gerhard Krause

By: [illegible]
Attorney

United States Patent Office 3,712,988
Patented Jan. 23, 1973

3,712,988
ANALOG DELAY CIRCUIT USING STORAGE DIODES

Gerhard Krause, Darmstadt, Germany, assignor to Fernseh G.m.b.H., Darmstadt, Germany Original application Sept. 18, 1968, Ser. No. 763,487. Divided and this application Apr. 2, 1971, Ser. No. 130,705
Claims priority, application Germany, Sept. 19, 1967, F 53,536; Oct. 18, 1967, F 53,813; Nov. 18, 1967, F 54,072; Jan. 31, 1968, F 54,687; Feb. 3, 1968, F 54,734; Mar. 5, 1968, F 54,984
Int. Cl. G11c *19/00*
U.S. Cl. 307—221 R 8 Claims

ABSTRACT OF THE DISCLOSURE

A plurality of storage diodes are connected in cascade by connecting the anode of each storage diode to the anode of a subsequent one via a connecting diode. A pulse sequence is applied to alternate cathodes and the remaining cathodes are either grounded or receive a pulse sequence of opposite polarity to the first pulse sequence. Analog signal to be delayed is connected to the first storage diode, delay signal is derived from the last storage diode after a delay determined by the frequency of the pulse sequence.

CROSS REFERENCE TO RELATED APPLICATION

This application is a division of my copending application, U.S. application No. 763,487, filed Sept. 18, 1968, now abandoned, entitled Resistance-Coupled Analogue Delay Circuit.

BACKGROUND OF THE INVENTION

A previously known arrangement for delay of continuous signals or analog type of signals comprises signal circulating circuits and delay line types of circuits. The delay lines were designed in the form of low-pass elements for the purpose of delaying such signals. When using such design the frequency limit of the elements should be considerably above the highest signal frequency, when the delay is to be independent of frequency. As a result, such delay lines involve considerable complexity and a large number of components in their construction. When long delays are required, large cable lengths are necessary, and these provide a large amount of damping and attenuation.

In referring to continuous signals or analog signals, it is to be understood that these signals may assume or contain every and any value between two limits, in contrast to a digital signal.

In accordance with the above-identified parent application, a circuit arrangement is provided for the delay of analog signals, through a series of analog storage units in stages having active elements. These active elements or components transfer the information within the analog signals from one storage unit or storage device into the next subsequent one. The frequency response of these active elements or components is at least twice that of the highest frequency to be transmitted in the analog signal. The same principle applies to analog storage units.

The circuit arrangement in accordance with the parent application and the present application exhibits the advantage which may be realized through the application of discrete components in the form of transistors, diodes, resistors and capacitors. The advantage resides mainly in the saving of space and components or elements when compared to a delay line using low-pass elements or cable lengths. This advantage is particularly outstanding when using integrated circuit techniques, to which the circuit arrangement of the present invention is especially applicable. The delay interval of each component or element is inversely proportional to the clock frequency. As a result, the delay interval is controllable in a continuous manner and over wide limits. The circuit arrangement in accordance with the present invention thereby solves many problems. Among these problems is the one in which an information source supplies information at a rate which is different from the rate at which a receiver accepts the information. An example of such a case resides in the elimination of the timing error associated with machines using video magnetic tapes.

SUMMARY OF THE INVENTION

The present invention is an analog delay arrangement for delaying analog signals and using storage diodes as the storage elements. Since in this type of storage diode it is possible with the circuit described below, to push the charge from one diode to the other with almost negligible dissipation, it is not necessary to use an active element between individual ones of said storage diodes.

The arrangement of this invention comprises a plurality of storage diodes each having a first and second storage electrode. These are connected in cascade by unidirectional conducting means, or more specifically, connecting diodes. The analog signal to be delayed is applied to the first storage element of the first so-connected storage diode. Control signal furnishing means furnish control signals to alternate ones of said second storage electrodes, said control signals being substantially identical and having a control signal frequency which is at least twice the highest signal frequency contained in said analog signal. The remaining second storage electrodes of said storage diodes are either connected to ground potential or receive a pulse sequence of opposite polarity to the pulse sequence applied as stated above. An analog signal delayed by a time period determined by the control signal frequency can then be derived from the first storage electrode of the last cascade connected storage diode.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 2:
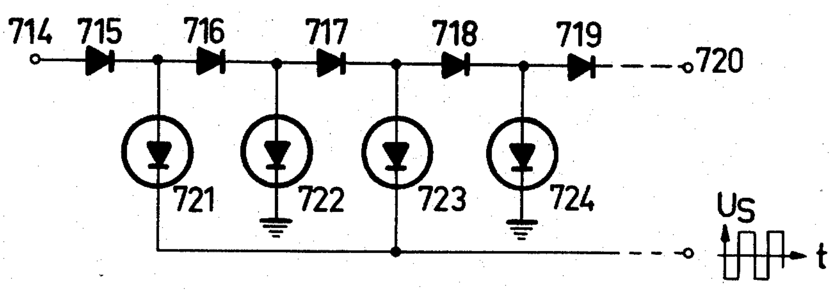
FIG. 2 is an embodiment of the present invention utilizing storage diodes, wherein alternate storage diodes have a cathode connected to ground potential.

The preferred embodiment of the present invention will now be discussed with reference to the drawing.

Figure 1:
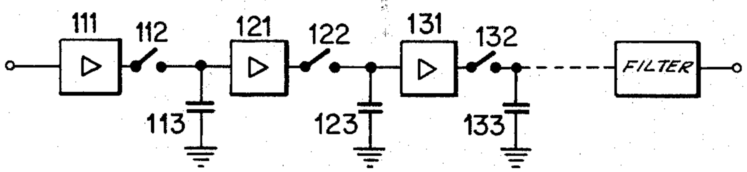
FIG. 1 is a functional schematic diagram showing the principle upon which the present invention is based.

Referring to FIG. 1 of the drawing, the amplifiers 111, 121, 131, . . . have a low output impedance and a gain of unity. The signal to be delayed is applied to amplifier 111. By closing switch 112, capacitor 113 is charged to the voltage corresponding to the instantaneous signal being applied. After switch 112 is reopened, switch 122 is closed and, as a result, capacitor 123 becomes charged to the same voltage as capacitor 113. After the opening of switch 122, the next control cycle begins in which, for example, capacitor 133 becomes charged to the voltage prevailing across 123, upon closure of switch 132, while switch 112 is closed again for the purpose of charging capacitor 113 to the next instantaneous voltage of the applied signal. The delayed signal may be taken from the last capacitor, through a low-pass filter. The frequency of the control pulses is at least twice as high as the highest frequency to be transmitted.

Referring to FIG. 2, the signal to be delayed is applied to the terminal 714. During the first half of the cycle of control signal $U_s$, current flow prevails through diodes 715 and 721, corresponding to the magnitude of the input signal. During this period of time, the cathode of diode 721 is at a negative potential. At the end of the first half cycle a charge is stored in diode 721. This charge is dependent upon the current through diodes 715 and 721. In the second half cycle of control signal $U_s$, a positive potential prevails at the cathode of the diode 721. A current often referred to as the clearance current, thereby, flows through the diode 721 and removes the charge of the diode. The diode 715 can be blocked or turned off within a shorter time interval than the diode 721. Accordingly, the current corresponding to the charge on diode 721, flows to diode 722 by way of diode 716. The cathode of diode 722 is connected to ground potential. During the next or subsequent negative half cycle of the control pulse, the cathodes of diodes 721 to 724 are at negative potential. During this following negative half cycle, the charge of diode 722 is transferred to diode 723, and diode 721 acquires a charge correspondnig to the instantaneous value of the input signal. These described processes are continuously repeated. During a half cycle of the control signal, the charge is advanced by one storage unit or stage, in the direction of output 720. To provide a delay of an entire period of the control signal, therefore, two connecting diodes (additional diodes) and two storage diodes are required.

Figure 3:
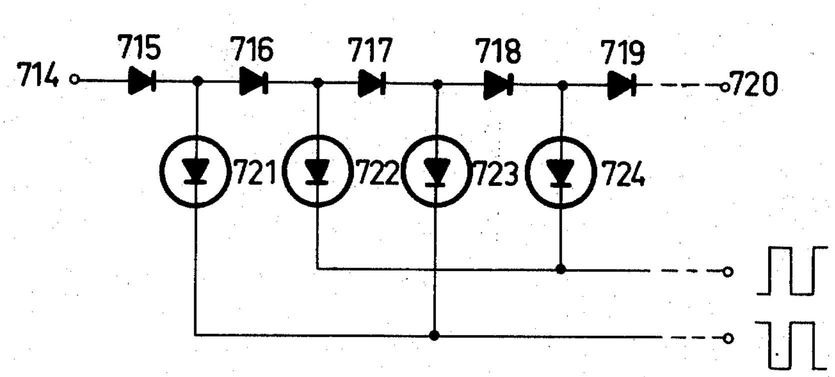
FIG. 3 is an embodiment of the present invention using storage diodes, wherein alternate storage cathodes receive a first control signal sequence, while the remaining storage diode cathodes receive a control signal sequence of opposite polarity.

FIG. 3 shows a circuit arrangement similar to that in FIG. 2. For reasons of symmetry, pulses are applied for controlling both diodes 722 and 724. These diodes have fixed potential applied to them in the arrangement of FIG. 11. The pulses applied to diodes 722 and 724 in FIG. 3, are of opposite phase to the pulse signal applied to diodes 721 and 723.

While the invention has been illustrated and described as embodied in particular signal delay arrangement, it is not intended to be limited to the details shown, since various modifications, circuit and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Arrangement for delaying an analog signal, comprising, in combination, a plurality of storage diodes each having a first and second storage electrode; unidirectional conducting means connecting said plurality of storage diodes in cascade; means for applying said analog signal to the first of said so-connected storage diodes; and control signal furnishing means furnishing substantially identical control signals at a control signal frequency to alternate ones of said second storage electrodes, whereby the analog signal appearing at the last of said first storage electrodes is delayed relative to the analog signal applied to said first storage diode by a time period determined by said control signal frequency.

2. A delay arrangement as set forth in claim 1, wherein said analog signal contains a highest signal frequency; and wherein said control signal frequency is at least twice said highest signal frequency.

3. A delay arrangement as set forth in claim 2, wherein said unidirectional conducting means comprise additional diodes.

4. A delay arrangement as set forth in claim 3, wherein said first and second storage electrodes are, respectively, the anode and the cathode of said storage diodes.

5. A delay arrangement as set forth in claim 4, wherein said control signal furnishing means comprise means for furnishing a pulse sequence to alternate ones of said cathodes of said storage diodes; and wherein the cathodes of the remaining ones of said storage diodes are at ground potential.

6. A delay arrangement as set forth in claim 4, wherein said control signal furnishing means comprise means for furnishing a first pulse sequence connected to the cathodes of alternate ones of said storage diodes, and means for furnishing a second pulse sequence of opposite polarity to said first pulse sequence, to the remaining ones of said cathodes of said storage diodes.

7. A delay arrangement as set forth in claim 4, wherein said means for applying said analog signal to said first storage diodes comprise a further additional diode.

8. A delay arrangement as set forth in claim 3, wherein the storage time constant of said additional diodes is substantially shorter than the storage time constant of said storage diodes.

References Cited

UNITED STATES PATENTS

| | | | |
|---|---|---|---|
| 3,253,162 | 5/1966 | Barnes et al. | 307—221 R X |
| 3,177,433 | 4/1965 | Simon et al. | 307—320 X |
| 3,289,010 | 11/1966 | Bacon et al. | 307—221 R |
| 3,533,000 | 10/1970 | Bushnell | 307—320 X |
| 3,183,448 | 5/1965 | Strother, Jr. et al. | 328—109 X |
| 3,471,711 | 10/1969 | Poschenrieder et al. | 328—37 X |
| 3,546,490 | 12/1970 | Sangster | 307—246 X |
| 3,184,605 | 5/1965 | Herzog | 307—320 X |
| 3,604,953 | 9/1971 | Carmody et al. | 307—319 X |

STANLEY T. KRAWCZEWICZ, Primary Examiner

U.S. Cl. X.R.

307—281, 293, 319; 328—37